United States Patent
Kleser et al.

(10) Patent No.: US 9,465,523 B2
(45) Date of Patent: Oct. 11, 2016

(54) VISUAL EXPLORATION OF MULTIDIMENSIONAL DATA

(71) Applicant: SAP SE, Walldorf (DE)

(72) Inventors: Gerald Kleser, Antibes (FR); Geraldine Bous, Mougins (FR)

(73) Assignee: SAP SE, Walldorf (DE)

( * ) Notice: Subject to any disclaimer, the term of this patent is extended or adjusted under 35 U.S.C. 154(b) by 163 days.

(21) Appl. No.: 13/929,012

(22) Filed: Jun. 27, 2013

(65) Prior Publication Data

US 2015/0007115 A1     Jan. 1, 2015

(51) Int. Cl.
G06F 3/048    (2013.01)
G06F 3/0484   (2013.01)
G06F 3/0482   (2013.01)
G06T 11/20    (2006.01)

(52) U.S. Cl.
CPC ........... *G06F 3/0484* (2013.01); *G06F 3/0482* (2013.01); *G06T 11/206* (2013.01)

(58) Field of Classification Search
None
See application file for complete search history.

(56) References Cited

U.S. PATENT DOCUMENTS

| | | | |
|---|---|---|---|
| 5,675,752 A | 10/1997 | Scott et al. | |
| 6,154,213 A * | 11/2000 | Rennison et al. | 715/854 |
| 6,167,396 A * | 12/2000 | Lokken | 707/737 |
| 6,484,190 B1 | 11/2002 | Cordes et al. | |
| 6,628,312 B1 | 9/2003 | Rao et al. | |
| 7,219,093 B2 | 5/2007 | Whitney, IV | |
| 7,287,234 B2 | 10/2007 | Leah et al. | |
| 7,617,185 B2 | 11/2009 | Werner et al. | |
| 7,657,848 B2 * | 2/2010 | Yakowenko et al. | 715/853 |
| 7,707,506 B2 | 4/2010 | Weigel et al. | |
| 8,010,910 B2 | 8/2011 | Wright et al. | |
| 8,122,337 B2 | 2/2012 | MacGregor et al. | |
| 8,510,659 B2 * | 8/2013 | Lam et al. | 715/734 |
| 8,677,279 B2 | 3/2014 | Gan et al. | |
| 8,935,602 B2 * | 1/2015 | Arora et al. | 715/208 |
| 2006/0136478 A1 * | 6/2006 | Berkner | 707/102 |
| 2009/0106194 A1 * | 4/2009 | Furusho | 707/3 |
| 2010/0287512 A1 * | 11/2010 | Gan et al. | 715/854 |
| 2010/0318943 A1 * | 12/2010 | Gong | G06F 17/30554 715/854 |
| 2011/0047515 A1 | 2/2011 | Choi et al. | |
| 2011/0138339 A1 | 6/2011 | Webster et al. | |
| 2012/0005228 A1 | 1/2012 | Singh | |
| 2014/0082540 A1 | 3/2014 | Armitage | |
| 2014/0122478 A1 * | 5/2014 | Huang et al. | 707/736 |
| 2014/0229901 A1 | 8/2014 | Chand et al. | |

OTHER PUBLICATIONS

"SAP History 1972-1981." <http://www.sap.com/corporate-en/our-company/history/1972-1981.epx>.

(Continued)

*Primary Examiner* — Anil N Kumar
(74) *Attorney, Agent, or Firm* — Jones Day

(57) ABSTRACT

Embodiments of the present disclosure provide systems and methods for displaying multidimensional data in a decomposition tree. The decomposition tree may include a plurality of levels, with the first level including a parent node representing the multidimensional data and the subsequent levels including one or more nodes representing a subset of the data repressed by the parent node along dimensions selected by a user. The decomposition tree may include nodes belonging to the same dimension in different levels of the decomposition tree. A node in the decomposition tree may be split by more than one dimension inside a same subsequent level.

20 Claims, 6 Drawing Sheets

(56) References Cited

OTHER PUBLICATIONS

"SAP at a glance: company information." <http://www.sap.com/corporate-en/our-company/index.epx>.
"SAP Labs Locations." <http://en.wikipedia.org/wiki/SAP_AG>.
"SAP Labs France, Sophia Antipolis." <http://www.sap.com/france/about/company/saplabs/index.epx>.
"Real-time Business Intelligence." <http://en.wikipedia.org/wiki/Real-time_business_intelligence>.
Jiawei Han and Micheline Kamber. "Data Mining Concepts and Techniques, Second Edition." San Francisco, California: Elsevier, Inc. 2006.
"Components of SAP BusinessObjects: Universes." Jul. 11, 2011. <http://bi-insider.com/posts/components-of-sap-businessobjects-universe>.
"JavaScript." <http://en.wikipedia.org/wiki/JavaScript>.
"jQuery." <http://jquery.com/>.
"D3.js Examples Gallery." <https://github.com/mbostock/d3/wiki/Gallery>.
"Get to Know the UI Development Toolkit for HTML5 (aka SAPUI5)." Sep. 13, 2012. <http://scn.sap.com/docs/DOC-31625>.
"Introducing JSON." <http://www.json.org>.
"Proclarity Analytics 6, ProClarity Professional 6.3 Getting Started Guide." 2007. ProClarity Corporation. <http://www.udc.edu/docs/irap/bb/GettingStartedGuide.pdf>.
"Tableau." <http://www.tableausoftware.com>.
"Polaris." <http://www.graphics.stanford.edu/projects/polaris/>.
Svetlana Mansmann and Marc H. Scholl, "Exploring OLAP Aggregates with Hierarchical Visualization Techniques." Applied computing 2007: Proceedings of the 2007 ACM symposium on Applied computing, Seoul, Republic of Korea—Mar. 11-15, 2007—New York, N.Y.: Association for Computing Machinery, 2007, pp. 1067-1073.
"Google Maps." <http://maps.google.com>.
"SAP HANA Cloud Platform. Connect andf Engage with Customers in the Cloud with SAP HANA® Cloud Platform." <http://download.sap.com/download.epd?context=E1A4FEB37A131BB9-80CC0D7AA6207C0920BFE6D440EEB26F2A48C0C01210A-A558A9F89F81D80442945C226963FD115BC4AE08ABAFA83-FA87>.
Frequently Asked Questions. SAP NetWeaver Cloud. Questions and Answers for Developers About SAP Netweaver® Cloud. SAP Netweaver Cloud—Developers. Jul. 2012. <http://www.sdn.sap.com/irj/scnigo/portal/prtroot/docs/library/uuid/d0cf2748-0a7f-2f10-6083-dacb66f34107?QuickLink=index&overridelayout=true&57475252383516>.
"Platform as a Service. SAP HANA Cloud Platform." SAP.com. <http://www54.sap.com/solutions/tech/cloud/software/netweaver-platform-as-a-service/index.html>.
Business Intelligence software solution projecti control—controlling Portal.de. Oct. 22, 2008. <http://www.controllingportal.de/Fachinfo/Business-Intelligence/OLAP-Online-Analytical-Processing.html>.
"Online analytical processing." <http://en.wikipedia.org/wiki/Online_analytical_processing>.
"OLAP AND OLAP Server Definitions. OLAP: On-Line Analytical Processing." The OLAP Council. 1995-1997. <http://www.olapcouncil.org/research/glossaryly.htm>.
Alfredo Cuzzocrea and Svetlana Mansmann. "OLAP Visualization: Models, Issues, and Techniques." 2009, pp. 1439-1446.
Vinnik, Svetlana and Mansmann, Florian. "From Analysis to Interactive Exploration: Building Visual Hierarchies from OLAP Cubes." 2006.
Bostock, Michael. "d3js.org. D3.js—Data-Driven Documents." 2012. <http://d3js.org/.
Data Visualization Software. SAP.com <http://www54.sap.com/solutions/analytics/business-intelligence/software/datavisualization/index.html>.
Heer, J., Bostock, M., & Ogievetsky, V. (2010). A Tour through the Visualization Zoo. Queue, pp. 20-30.
Mansmann, S., Mansmann, F., Scholl, M., & Keim, D. (2007). Hierarchy-driven Visual Exploration of Multidimensional Data Cubes. Proceedings of BTW 2007, pp. 96-111.
Stolte, C., Tang, D., & Hanrahan, P. (2003). Multiscale visualization using data cubes. IEEE Transactions on Visualization and Computer Graphics, 9, pp. 176-187.
Vinnik, S., & Mansmann, F. (2006). From analysis to interactive exploration: Building visual hierarchies from OLAP cubes. Proceedings of the 10th International Conference on Extending Database Technology, pp. 496-514.
Wang, B., Chen, G., Bu, J., & Yu, Y. (2010). Multiscale Visualization of Relational Databases Using Layered Zoom trees and Partial Data Cubes. Proceedings of the International Conference on Information Visualization Theory and Applications (IVAPP'10).
"AP Business Objects." (Oct. 27, 2008). Exploration Trees. From Sap Community Network. <http://web.archive.org/web/20100213204748/http://www.sdn.sap.com/irj/boc/innovation-center?rid4webcontent/uuid/a09462a0-7c98-2b10-fb97-020d7e6d1aff>.

\* cited by examiner

100

200

300

VISUAL EXPLORATION OF MULTIDIMENSIONAL DATA

BACKGROUND

In today's competitive markets, organizations need to make quick business decisions (e.g., identifying opportunities, strategy and market advantages) based on constantly changing conditions. Collecting, analyzing and displaying the data are integral parts of making such decisions. However, as the volume of data that an organization collects, analyzes and displays is increased, it becomes more difficult for the organization to make quick and accurate decisions. Even after the large volume of data is collected and analyzed, it is still challenging to display this data to a manager of the organization in an easy to understand and visually pleasant way.

Online analytical processing (OLAP), multidimensional data models and relations database models have improved the way organizations view the data by summarizing the data from the organizations database. However, even with these models managers of organizations are not always provided with easy to use and interactive methods to view and browse data that provides a good picture of the organizations positions or capabilities.

BRIEF DESCRIPTION OF THE DRAWINGS

The accompanying drawings illustrate the various embodiments and, together with the description, further serve to explain the principles of the embodiments and to enable one skilled in the pertinent art to make and use the embodiments.

DETAILED DESCRIPTION

Embodiments of the present disclosure provide systems and methods for displaying multidimensional data in a decomposition tree. The decomposition tree may include a plurality of levels, with the first level including a parent node representing the multidimensional data and the subsequent levels including one or more nodes representing a subset of the data repressed by the parent node along dimensions selected by a user. The decomposition tree may include nodes belonging to the same dimension in different levels of the decomposition tree. A node in the decomposition tree may be split by more than one dimension inside a same subsequent level.

The decomposition tree allows users to view and gain insight from large and complex datasets. The decomposition tree according to the embodiments of the present disclosure provides an easy way to visualize and explore the data and allows users to easily customize the display of the data. The user can display data that is needed to make a decision without having to display data that may clutter the decomposition tree. By allowing the user options to split a single node by different dimensions and to display nodes split by different dimension in a same level of the decomposition tree, the user may generate a customized decomposition tree that is not restricted to a rigid hierarchical mapping between the tree levels and dimensions.

Figure 1:
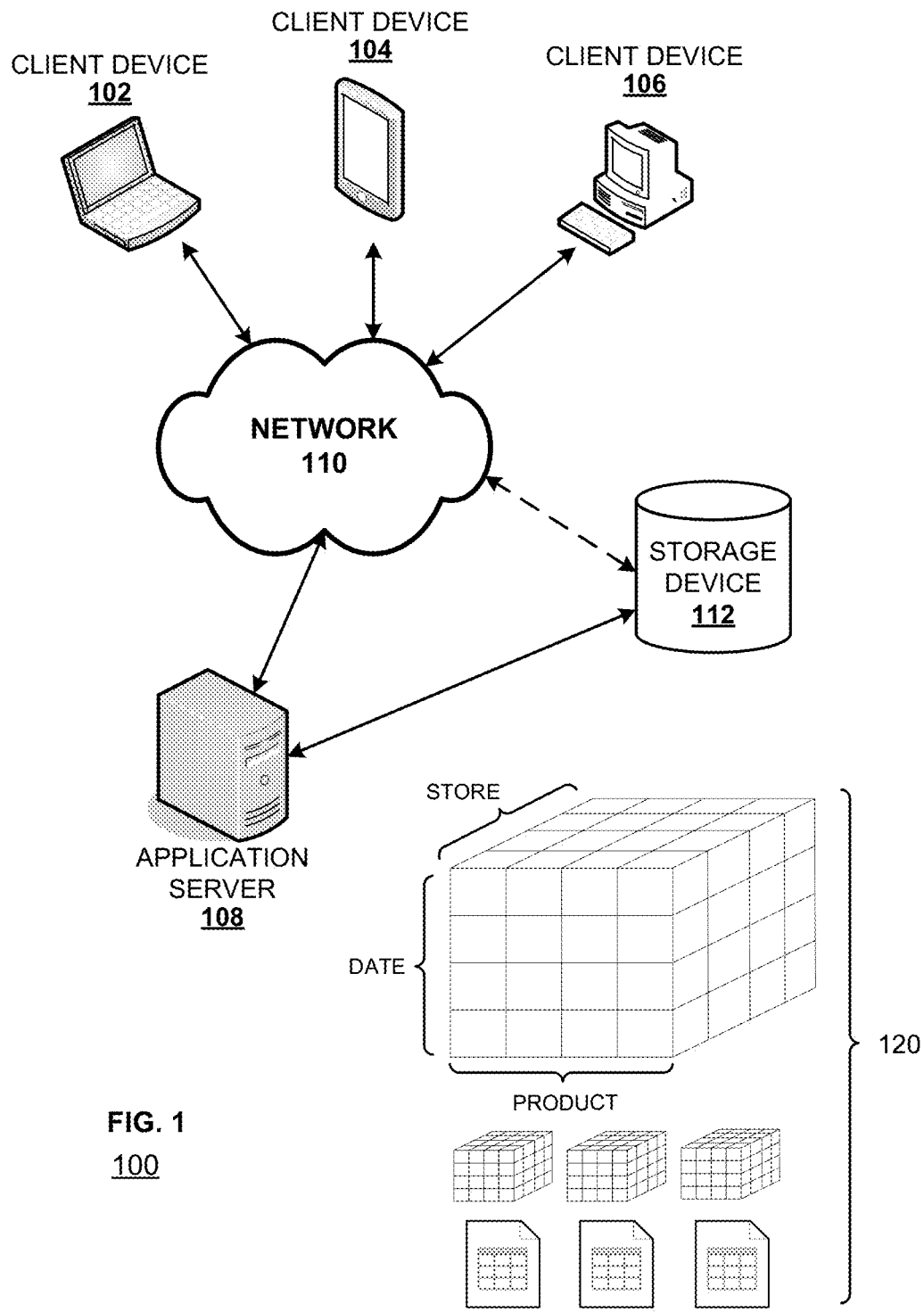
FIG. 1 is a block diagram illustrating an example embodiment of a networked environment in which a client device connects to an application server via a network.

FIG. 1 is a block diagram illustrating an example embodiment of a networked environment 100 in which a client device 102, 104 or 106 connects to an application server 108 via a network 110. The client device 102, 104, or 106 may execute applications provided on the respective client device 102, 104 or 106 or may execute web-based applications provided by the application server 108 via the network 110. The applications executed by the client device 102, 104, or 106 may be used to display data 120 stored in the application server 108 and/or the data storage device 112. The data may be displayed on the client device 102, 104, or 106 according to one or more of the embodiments described below. Based on the displayed data a user may make business decisions for an organization. The user may issue instructions for the organization via the client device 102, 104, or 106.

The client device 102, 104, 106 may include, for example, a mobile device (e.g., mobile phone or a smart phone), a personal computer, a tablet, a terminal device, or a personal digital assistant (PDA). The client device 102, 104, 106 may include an input device (e.g., a touch screen, a touch pad, a mouse or a keyboard) to receive commands from a user.

The data storage device 112 may be a data warehouse. The data warehouse may perform data cleaning, integration, transformation and refreshing. The data storage device 112 may be an in-memory database (e.g., SAP® HANA database).

The data 120 may be stored and analyzed based on the multidimensional data models and/or relational database models. Multidimensional data may be analyzed via analytical operations (e.g., Online Analytical Processing (OLAP)) to provide a quick and interactive means of data analysis. OLAP operations may provide the data analysis on a higher level than the traditional relational database models. The results of OLAP may be referred to as OLAP cube (e.g., multidimensional OLAP Cube).

The data may be grouped into dimension and measure categories. The measure may be a key figure representing a value (e.g., consumer count, amount of sales, revenue or cost). The dimension may include data elements or members that are used to group, filter and/or label the measures (e.g., by store, by month, or by product). As shown in FIG. 1, the OLAP cube may include multiple dimensions (e.g., product, date and store dimensions). When the data is accessed by a user in response to a request, the request may split a measure by zero, one or multiple dimensions. For example, the request may include "display revenue by product," "display amount of sales per country," or "display revenue for a specific country by product." FIG. 1 shows data 120 being split by product, data and store.

The OLAP operations on the multidimensional data may include slicing, dicing, drill down and drill up, roll-up and pivoting. Slicing may select a subset of a cube by choosing a single value for a dimension. Slicing may create a new object having one dimension less than the previous object. Dicing may select a subset of a cube by choosing multiple values for the dimensions. With dicing the number of dimensions may remain the same but the new object may have less data. The drill down operation may provide the user a more detailed view by breaking up summarized data along the dimensional hierarchy. For example, a user may view sales by continent and then drill down to sales per country or sales per region. The drill up operation may reduce the level of detail by summarizing multiple dimensions into a parent dimensions. The drill up operation may be restricted to summarizing the dimensions that are within the dimensional hierarchy. Similar to drill up operation, the roll up operation may summarize data but may summarize arbitrary dimensions by using, for example, mathematical formulas. The pivoting operation is a visualization operation that allows users to rotate the axes of a cube to see another face of the cube. The above discussed OLAP operations may provide an OLAP cube to be displayed in the decomposition tree according to embodiments of the present disclosure.

Figure 2:
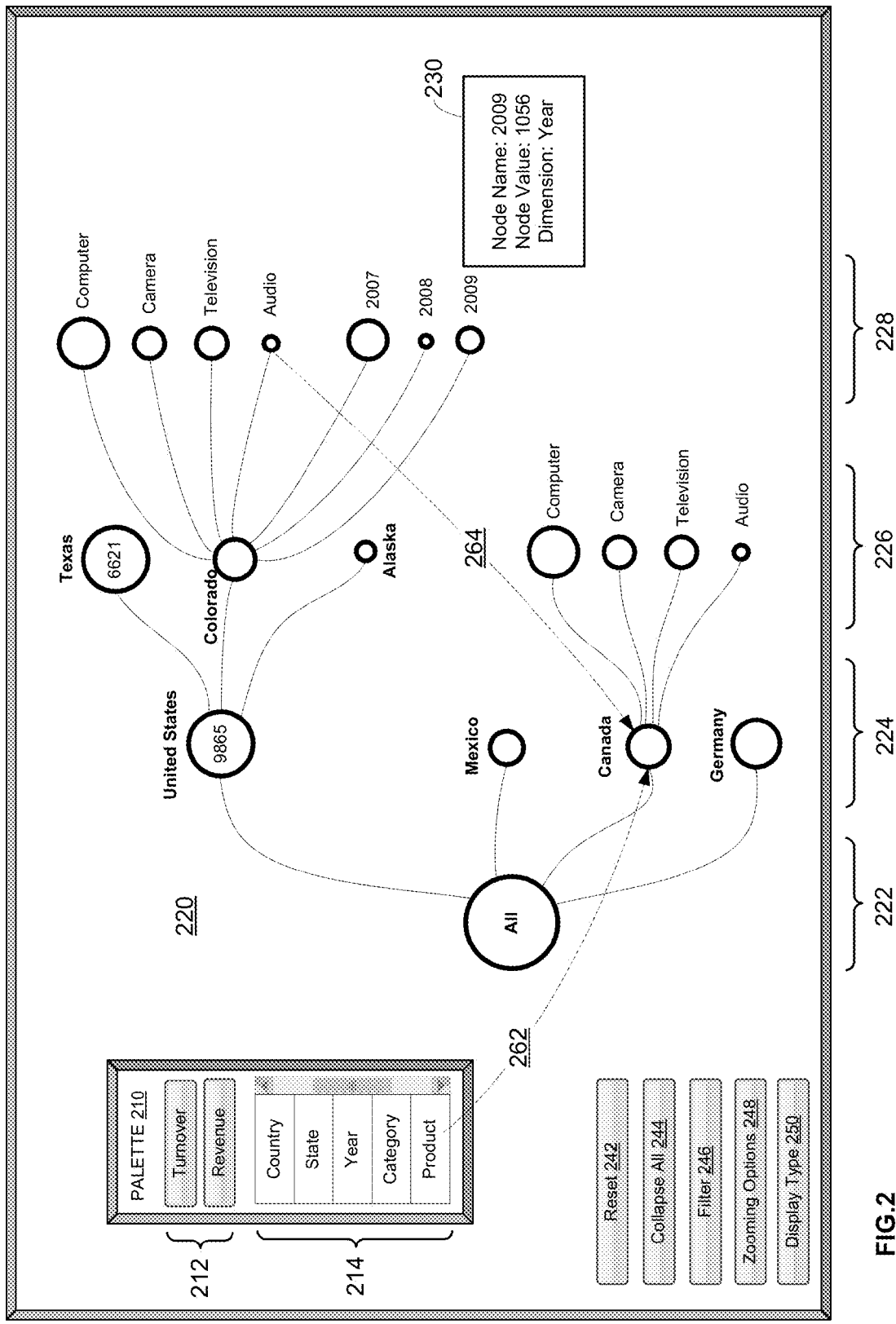
FIG. 2 illustrates a user interface displaying a hybrid decomposition tree according to an embodiment of the present disclosure.

FIG. 2 illustrates a user interface 200 displaying a hybrid decomposition tree 210 according to an embodiment of the present disclosure. The hybrid decomposition tree 210 may allow for multiple dimensions of data to be displayed in one level of the decomposition tree and/or for one dimension to be displayed in different levels of the decomposition tree 210. The user interface 200 may include a palate 210, a decomposition tree 220 and a node details display 230. The user interface 200 may be displayed on a display of the client device 102, 104 and 106, shown in FIG. 1.

The palate 210 may provide the user with measures 212 and dimensions 214 that can be assigned to nodes and/or levels of the decomposition tree 210. The available measures 212 and/or dimensions 214 may be selected by the user and associated with the desired node or level in the decomposition tree 210 by, for example, a drag and drop gesture. The measures 212 and/or dimensions 214 may be associated with a single node by selecting the desired measures 212 and/or dimensions 214 for the node. In one embodiment, the measures 212 and/or dimensions 214 may associated with a selected node by dragging and dropping them on the selected node or they may be associated with all of the selected nodes by dropping the measure 212 or dimension 214 on a portion of a display that does not correspond to a displayed node. The measures 212 may be associated with a level of displayed nodes by associated the measure with a desired level of the decomposition tree 210. The measures 212 and/or dimensions 214 may also be associated with a node that is selected by a leap controller, a kinect controller, touch screen or other selection methods.

The measures 212 and dimensions 214 displayed in the palate 210 may be the measures 212 and dimensions 214 that are associated with data of an organization or with a specific portion of the data of the organization (e.g., specific multi-dimensional OLAP cube). The content of the palate 210 may change based on updates to the data and/or selections made by the user in the user interface.

The decomposition tree 220 includes a tree-based layout including data elements that are displayed as nodes of the decomposition tree 220. The nodes may include a root node which operates as a parent node for a plurality of children nodes. Each child node may be a parent node to a plurality of subsequent children nodes (e.g., great grandchild of the root node). The decomposition tree 220 may include a plurality of levels 222, 224, 226 and 228 formed by the nodes. Each level 222, 224, 226 and 228 may include one or more nodes. The hierarchy of the nodes between the levels 222, 224, 226 and 228 may be visually illustrated by connecting lines.

The nodes in each level 222, 224, 226 and 228 may convey a notion of quantity by visual encoding. For example, individual objects such as bars or circles with a portion of the object filled in or colored, differently sized objects, numbers or text within the object, different colors, or symbols may be used to convey the quantity represented by the node. As shown in FIG. 2, the size or area of the circle representing each node may convey the quantity associated with each node.

When the value of the nodes is displayed via visual encoding, the scaling of the nodes may include global scaling or level scaling. With global scaling the size or area of the object representing each node may be a percentage of the root node (e.g., measure node). With level scaling, a node's size or area may be a percentage of the of the largest sibling node in the group of nodes. Regardless of the type of scaling that is selected, a minimum size of the object may be set to allow nodes with very low values to be easily visible in the decomposition tree 220.

In another embodiment, sub-tree scaling may allow the user to select one node to which the largest radius is assigned and the children nodes of the selected node may be rescaled based on the selected node. The remaining nodes (e.g., nodes not included in the sub-tree selected) may be scaled to have a minimum size (e.g., minimum radius).

Each level 222, 224, 226 and 228 of the decomposition tree 220 may include nodes that belong to more than one splitting dimension. In one embodiment, a node in one level may be split up by different dimensions simultaneously to provide a next level with multiple dimensions. For example, as shown in FIG. 2, the Colorado node from level 226 may be split to provide level 228 that includes nodes split by a product dimension (e.g., computer, camera, television and audio) and nodes split by a year dimension (e.g., 2007, 2008 and 2009). Thus, single level 228 includes nodes that are split by more than one dimension.

In another embodiment, a plurality of nodes in one level may be split according to different dimensions. For example, as shown in FIG. 2, level 226 may include nodes that are split by state dimension (e.g., Texas, Colorado and Alaska) from the United States node in level 224 and may include nodes that are split by product dimension (e.g., computer, camera, television and audio) from the Canada node in level 224. In one embodiment, each node in one level may be split according to different dimensions.

As shown in FIG. 2, some nodes may not be split. The user may select which nodes should be split by desired dimensions while other nodes are shown without being split by any dimensions. This may allow for the nodes to be displayed with the desired detail while avoiding the clutter of information that is not needed to make a business decision.

The user interface 200 may display the relationship of each node to the preceding nodes (e.g., relationship of parent nodes to child nodes). The visual encoding of the tree may display to which dimension each group of nodes belongs. In FIG. 2 this is shown with lines linking the nodes. In other embodiments, color or shape of the nodes may be used to show groups of nodes that are split by the same dimension. For example, all of the nodes that are split by the type of product may be color coded with the same color. In other embodiments, grouping clusters or instances of one dimension together may visually convey the relationship of the nodes.

The nodes in the decomposition tree 220 representing instance value of a dimension may be used to split other nodes by the associated dimension. For example, a node representing Audio, which is an instance value of the product dimension, may be used in the same way as the product dimension from the palate 210. Thus, as illustrated by line 264 a user may drag the node representing Audio, to another node (e.g., Canada node) in the decomposition tree 220 to split the node by the product dimension. In the same way, as represented by line 262, the user may drag the product dimension in the palate 210 to the Canada node to split the Canada node by the product.

The nodes of the decomposition tree 220 may be sorted based on the node properties (e.g., values of the node or dimension values). In one embodiment, a specific level or group of nodes may be arranged in order based on the value represented by each node. For example, as shown in FIG. 2, the nodes in level 226 may be arranged in descending order from top to bottom of the display. The Texas node with a larger value may be displayed first with a larger circle and the Alaska node with a smaller value may be displayed last with a smaller circle. In other embodiments, the nodes in a specific group or level of the decomposition tree 220 may be sorted by the name of the node (e.g., alphabetical or numerical order). For example, as shown in FIG. 2, the nodes corresponding to the year in level 228 are arranged in ascending order.

The value of the node may be included as part of the node (e.g., US node and Texas node) or the value of the node may be provided in a separate dialog box 230. The dialog box 230 may include one or more of the node name, node value, dimension by which the node is split, the dimensions by which the node may be further split, when the value was updated, statistics on the value of the node and trend of the node value. The dialog box 230 may be displayed in response to a request by the user (e.g., clicking gesture or gesture putting cursor or finger over the node for which the details are to be displayed).

The nodes in the decomposition tree 220 may be directly manipulated. As discussed above, a dimension may be assigned to a node by dragging the dimension from the palate 210 to a destination node. The destination node becomes the parent of a new level of analysis nodes for the assigned dimension. Similarly, if a node is assigned to another node by dragging an instance node onto a destination node, the destination node may become the parent of a new level of analysis nodes. The dimension of the split may be the same as the dimension of the instance node that is dragged onto the destination node.

The nodes may be assigned a measure 212. Different measures 212 may be assigned to different nodes. If a node is assigned a specific measure, the nodes that are emanating from the node may be assigned the same measure. Multiple measures 212 may be assigned to each node. Thus, multiple measures 212 may be displayed in the same view. If a certain measure is assigned to the decomposition tree or a portion of the decomposition tree 220, a new measure may be applied to the decomposition tree 220 of a portion of the decomposition tree 220 by dragging a new measure from the palette 210 to the nodes of the decomposition tree 220.

The user interface 200 may include a plurality of user controls to control the way the decomposition tree is displayed. The user controls may include one or more of reset 242, collapse all 244, filter 246, zooming options 248 and display type 250. The reset 242 may provide the use with option to reset the display of the decomposition tree 220. When activated, the reset control 242 may remove the display of all of the levels of the decomposition tree. In another embodiment, the reset control 242 may remove the display of all of the levels of the decomposition tree 220 with the exception of the first level (e.g., level 222).

The collapse all control 244 may collapse all of levels of the decomposition tree 220. The collapse all control 244 does not remove the dimensions that are selected in the levels but may hide the display of selected dimensions in the levels of the decomposition tree. In another embodiment, the user may have an option to collapse one or more portions of the decomposition tree 220 by selecting a node and picking an option to collapse all of the nodes that are derived from the selected node. The collapse option may allow the user to collapse sections of the decomposition tree 220 that are not needed by the user to make a decision. When the collapsed section of the decomposition tree 220 are needed again by the user, the user may request that all or a portion of the collapsed sections of the decomposition tree 220 are displayed again.

The filter option 246 may filter the data that is displayed in the nodes. For example, the filter option may select not to display data associated with specific dimensions, not to display data with values that exceed a preset value, not to display data with values that are below a preset value, not to display data with values that change more than a desired frequency, to display data that is associated only with a certain dimension, or to display data that changes at a predetermined frequency. The filter 246 may be applied after the decomposition tree 220 is displayed with the selected dimensions. Setting the filter 246 may update the display of the decomposition tree 220 with data based on the setting made in the filter 246.

The zooming option 248 may zoom in, zoom out and pan across the decomposition tree 220. The zooming option 248 may be used when a user wants to closely examine a portion of the decomposition tree or when the size of the decomposition tree exceeds a size that can be easily displayed in the available display.

The display type control 250 may provide user with different options of how to render the decomposition tree 220. The display type control 250 may include selecting the type of objects (e.g., circle or squares) used to represent the nodes, the colors and shading of the nodes, how values are represented in the nodes, how the interconnections between the nodes are shown and the rendering of the decomposition tree 220 (e.g., left to right, right to left, top to bottom or polar rendering, discussed below).

A plurality of decomposition trees 220 may be displayed simultaneously. In one embodiment, a user may copy a generated decomposition tree 220 and display the copied decomposition tree 220 with a different measure. The copied decomposition tree may have the same displayed hierarchy and dimensions as the original decomposition tree.

Figure 3:
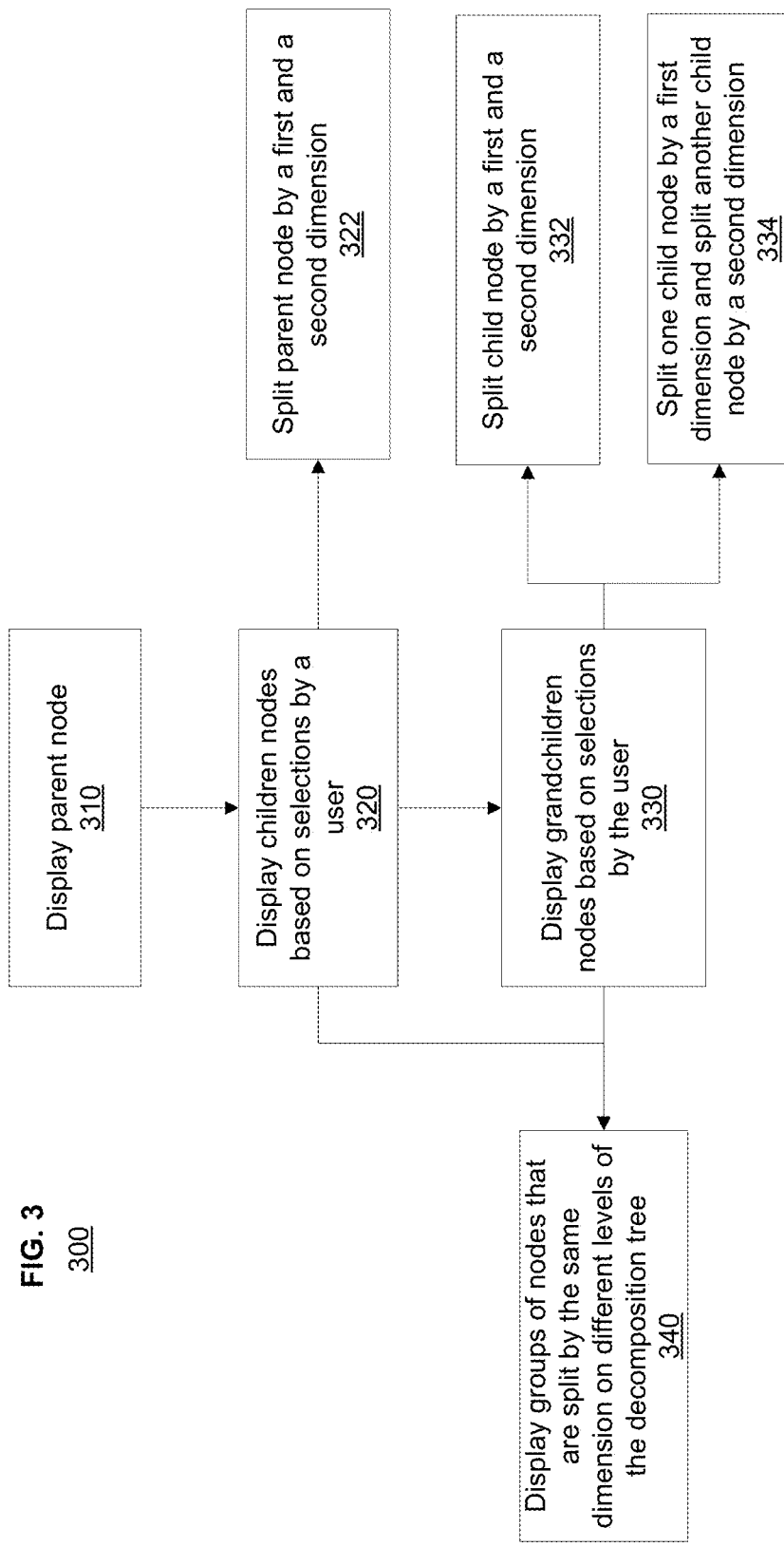
FIG. 3 illustrates a method of displaying a decomposition tree according to an embodiment of the present disclosure.

FIG. 3 illustrates a method 300 of displaying a decomposition tree according to an embodiment of the present disclosure. The method 300 may include displaying a parent node based on selections made by a user 310, displaying children nodes based on selections made by the user 320, and displaying grandchildren nodes based on selections made by the user 330. While not shown in FIG. 3, the method 300 may include displaying additional nodes (e.g., great-grandchildren nodes) in additional levels of the decomposition tree.

Displaying the parent node based on selections made by a user 310 may include creating a parent node, accessing the data associated with the parent node and rendering the rood node in the decomposition tree based on the data associated with the parent node. The parent node may be displayed based on the measure selected by the user. The measure may be selected from a palate displaying the available measures. The parent node may be displayed in a first level of the decomposition tree.

Displaying the children nodes based on selections made by the user 320 may include receiving instructions from the user to split the parent node by one or more dimension. Displaying the children nodes may include creating the children nodes, accessing the data associated with the children nodes and rendering the children nodes in the decomposition tree based on the data associated with the children nodes. The children nodes may be displayed as groups of nodes, each group of nodes representing one of the selected dimensions. The parent node may be split by a first dimension and by a second dimension, which is different from the first dimension 322. The children nodes may be displayed in a second level of the decomposition tree. Thus, the nodes provided along the first dimension and the nodes provided along the second dimension may be provided in the same level (e.g., second level) of the decomposition tree.

Displaying the grandchildren nodes based on selections made by the user 330 may include receiving instructions from the user to split one or more of the children node by one or more dimension. Displaying the grandchildren nodes 330 may include creating the grandchildren nodes, accessing the data associated with the grandchildren nodes and rendering the grandchildren nodes in the decomposition tree based on the data associated with the grandchildren nodes. The grandchildren nodes may be displayed as groups of nodes, each group of nodes representing one of the selected dimensions. One of the children nodes may be split by a first dimension and by a second dimension, which is different from the first dimension 332. One of the children nodes may be split by a first dimension and another children node may be split by a second dimension 334. The grandchildren nodes may be displayed in a third level of the decomposition tree. Thus, the nodes provided along the first dimension and the nodes provided along the second dimension may be provided in the same level (e.g., third level) of the decomposition tree.

The method 300 may include displaying groups of nodes that are split by the same dimension on different levels of the decomposition tree. For example, a node in the second level of the decomposition tree may be split by a particular dimension and a node in a third level may also be split by the same particular dimension.

Displaying the nodes in steps 310-340 may include rendering the nodes and connections between the nodes to provide a visual representation of the values represented by the nodes and/or the hierarchy between the nodes.

In FIG. 2, the decomposition tree is shown with the hierarchy being rendered from left to right. In other embodiments, the decomposition tree may be rendered with the hierarchy being shown from right to left, from top to bottom, or from bottom to top of the display screen. Changes in the orientation of the screen displaying the decomposition tree may automatically change the way the decomposition tree is displayed based on the available space in the display. The top to bottom rendering may be used when the display is provided with a portrait orientation. The user may select the type of rendering that is used to display the decomposition tree.

Figure 4A:
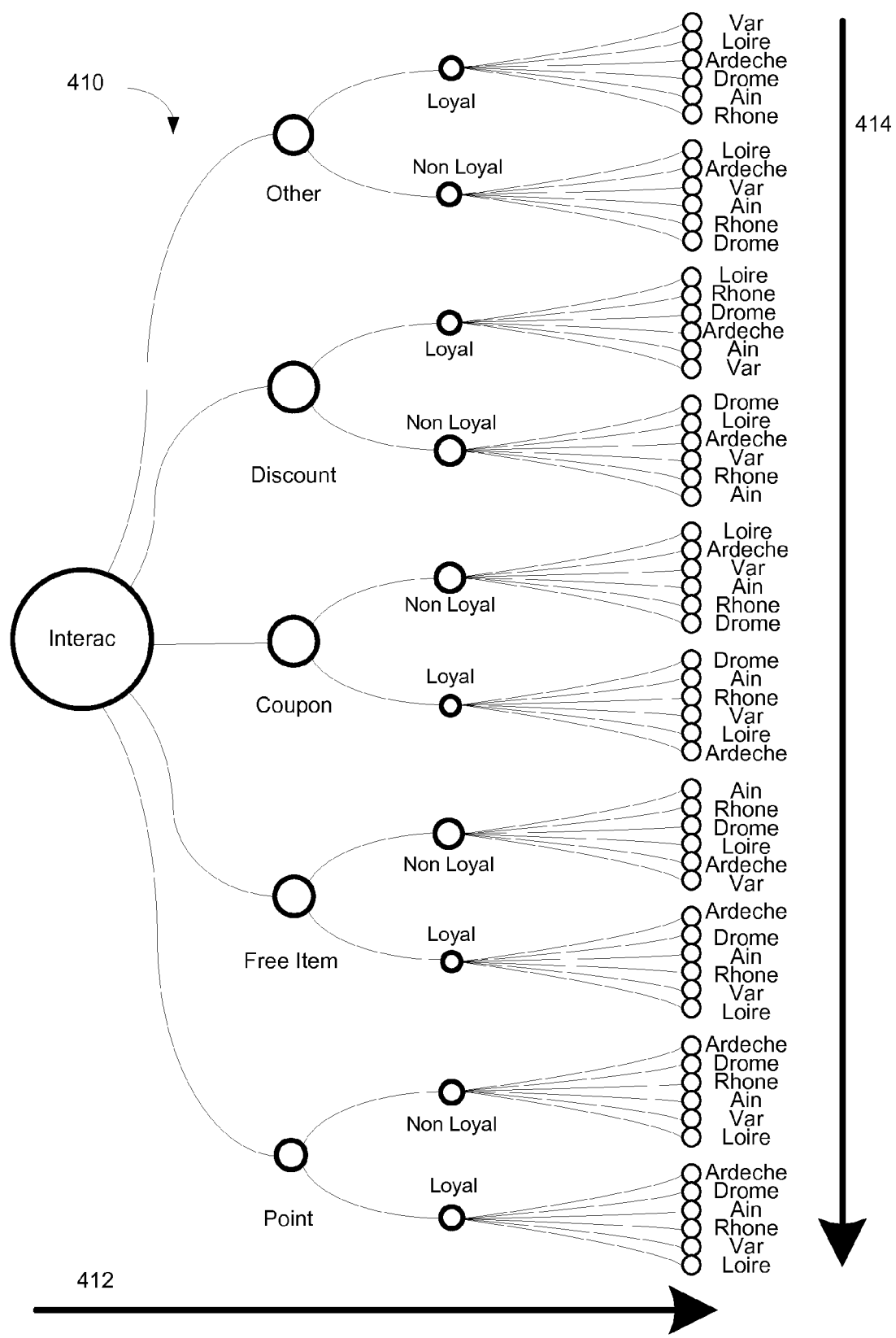
FIGS. 4A and 4B illustrate a linear decomposition tree and a polar decomposition tree according to an embodiment of the present disclosure.
Figure 4B:
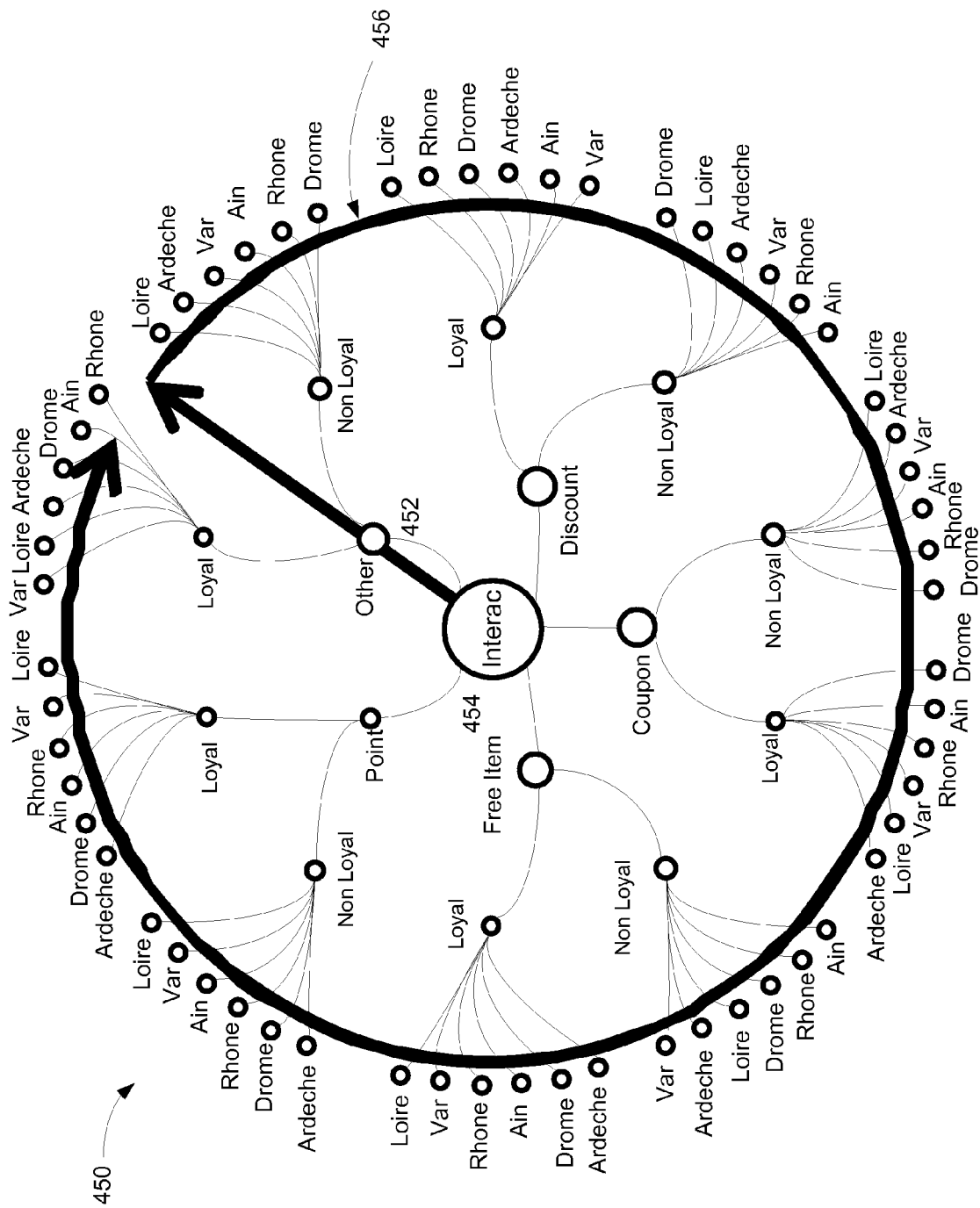

FIGS. 4A and 4B illustrate a linear decomposition tree 410 and a polar decomposition tree 450 according to an embodiment of the present disclosure. The linear decomposition tree 410 may be rendered as a polar (e.g., circular) decomposition tree 450. In the linear decomposition tree 410 the x-coordinate 412 may define the multiple levels within the tree and the y-coordinate 414 may define the groups of nodes split by the respective dimension. In the polar decomposition tree 450 the radius 452 from the center 454 (e.g., root node) of the polar decomposition tree 450 may define the multiple levels with the tree and the perimeter 456 of the decomposition tree at each radius may define the groups of nodes split by the respective dimension. The polar decomposition tree 450 may be used when a large number of nodes need to be displayed in each level.

The front end of the application providing the decomposition tree according to the present disclosure may be written in JavaScript, for example using User Interface Development Kit for HTML5 (SAP® UI5), but is not so limited. The back end of the application may use SAP® Analytics on Demand (AoD), where OLAP data is supplied by AoD, but is not so limited.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the disclosure may be implemented using Java, C++, or other object-oriented programming language and development tools. Another embodiment of the disclosure may be implemented in hardwired circuitry in place of, or in combination with machine readable software instructions.

Figure 5:
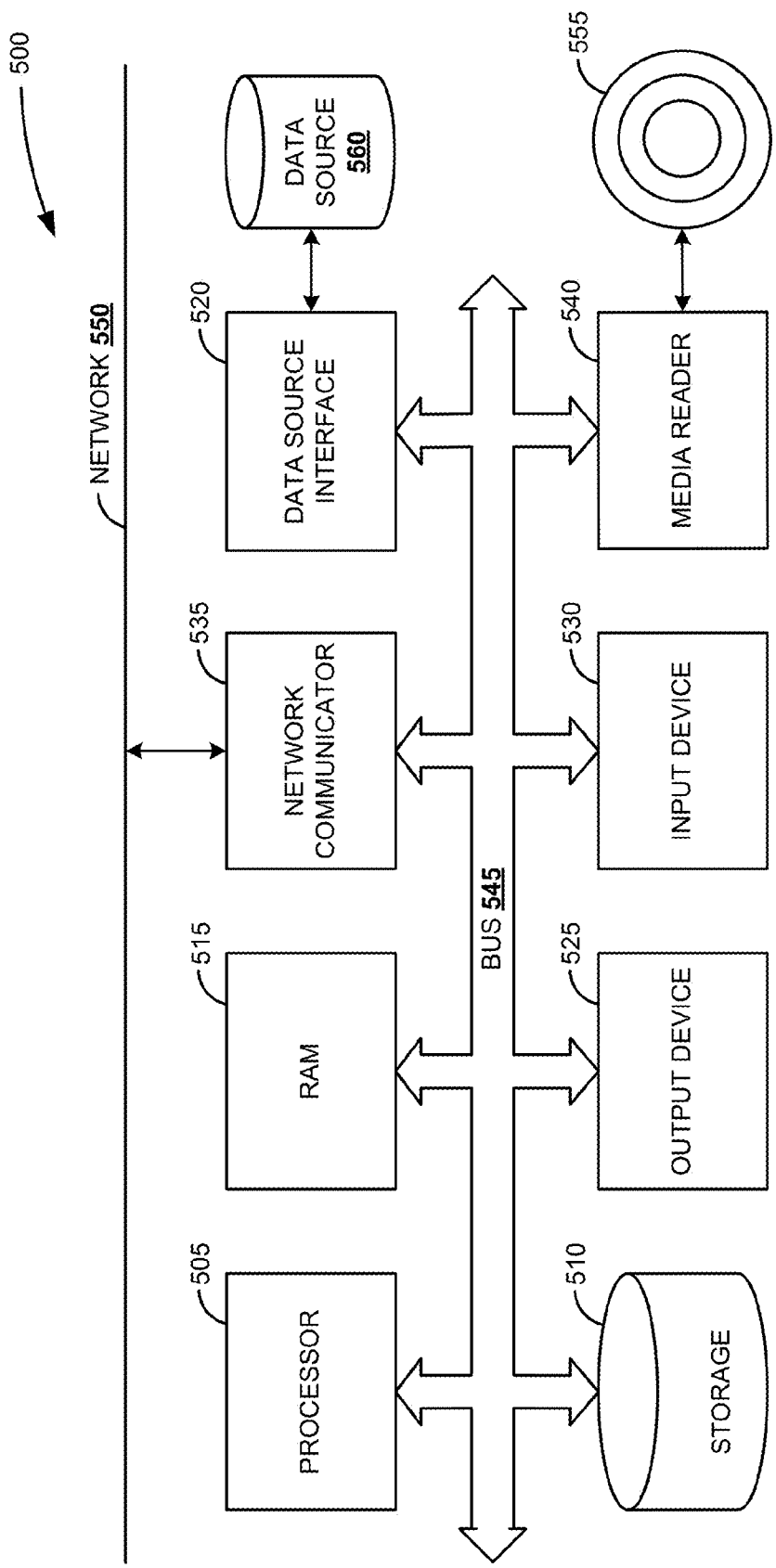
FIG. 5 is a block diagram of an exemplary computer system that may be used with the embodiments of the present disclosure.

FIG. 5 is a block diagram of an exemplary computer system 500. The computer system 500 includes a processor 505 that executes software instructions or code stored on a computer readable storage medium 555 to perform the above-illustrated embodiments of the disclosure. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. The stored instructions may be further compiled to generate other representations of the instructions and dynamically stored in the RAM 515. The processor 505 reads instructions from the RAM 515 and performs actions as instructed. According to one embodiment of the disclosure, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

A semantic layer is an abstraction overlying one or more data sources. It removes the need for a user to master the various subtleties of existing query languages when writing queries. The provided abstraction includes metadata description of the data sources. The metadata can include terms meaningful for a user in place of the logical or physical descriptions used by the data source. For example, common business terms in place of table and column names. These terms can be localized and or domain specific. The layer may include logic associated with the underlying data allowing it to automatically formulate queries for execution against the underlying data sources. The logic includes connection to, structure for, and aspects of the data sources. Some semantic layers can be published, so that it can be shared by many clients and users. Some semantic layers implement security at a granularity corresponding to the underlying data sources' structure or at the semantic layer. The specific forms of semantic layers includes data model objects that describe the underlying data source and define dimensions, attributes and measures with the underlying data. The objects can represent relationships between dimension members, provides calculations associated with the underlying data.

In the above description, numerous specific details are set forth to provide a thorough understanding of embodiments of the disclosure. One skilled in the relevant art will recognize, however that the various embodiments can be practiced without one or more of the specific details or with other methods, components, techniques, etc. In other instances, well-known operations or structures are not shown or described in detail to avoid obscuring aspects of the disclosure.

Although the processes illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present disclosure. Moreover, it will be appreciated that the processes may be implemented in association with the apparatus and systems illustrated and described herein as well as in association with other systems not illustrated.

The above descriptions and illustrations of embodiments of the disclosure, including what is described in the Abstract, is not intended to be exhaustive or to limit the embodiments to the precise forms disclosed. While specific embodiments of, and examples for, the embodiments are described herein for illustrative purposes, various equivalent modifications are possible within the scope of the disclosure, as those skilled in the relevant art will recognize. These modifications can be made to the embodiments in light of the above detailed description.

We claim:

1. A computer implemented method for displaying multi-dimensional data, the method being implemented by one or more data processors forming part of at least one computing device and comprising:

displaying, by at least one data processor in a graphical user interface, a decomposition tree including a plurality of levels, a first level including a parent node representing data with a measure along multiple dimensions and other levels including one or more child nodes that represent a subset of the data represented by the parent node along dimensions selected by a user, wherein the child nodes are displayed along a same dimension at different levels of the decomposition tree;

in response to the user applying a first splitting dimension and a second splitting dimension to a first selected node and a second selected node, displaying, by at least one data processor in the graphical user interface, in a next level following a level with the first selected node and a second selected node, one or more nodes along the first splitting dimension and one or more nodes along the second splitting dimension, wherein the one or more nodes along the first and second splitting dimensions are intersecting datasets and the user applies the first splitting dimension and the second splitting dimension to the first selected node by dragging the first and second splitting dimensions to the first selected node from a palate displaying available dimensions and the user applies the first splitting dimension and the second splitting dimension to the second selected node by dragging the first selected node in the decomposition tree to the second selected node, wherein the applied first splitting dimension and the applied second splitting dimension of the first selected node are applied to the second selected node and remain applied to the first selected node;

rendering, by at least one data processor in the graphical user interface, objects representing the parent node and the child nodes to graphically illustrate values represented by the nodes; and rendering, by at least one data processor in the graphical user interface, connections representing the relationship between the parent node and the child nodes.

2. The computer implemented method of claim 1, wherein each node is illustrated by an object having at least a minimum size and the value represented by the node is presented by visually encoding the object.

3. The computer implemented method of claim 1, wherein each node is illustrated by a circle having at least a minimum radius and the value represented by the node corresponds to a size of the circle.

4. The computer implemented method of claim 1, wherein at least one node represents a plurality of measures.

5. The computer implemented method of claim 1, further comprising, in response to user selections, collapsing, by at least one data processor in the graphical user interface, a portion of the decomposition tree.

6. The computer implemented method of claim 1, further comprising, in response to the user applying the first splitting dimension to the first selected node and applying the second splitting dimension to the second selected node, the first and second selected nodes being in the same level, displaying in the level following the level including the first and second selected nodes one or more nodes along the first splitting dimension from the first selected node and one or more nodes along the second splitting dimension from the second selected node.

7. The computer implemented method of claim 1, wherein the parent node is split by multiple dimensions in a level following the level of the parent node.

8. A non-transitory computer readable medium containing program instructions from providing a user interface with multi-dimensional data on a user device, wherein execution of the program instructions by one or more processor of a computer system causes one or more processors to carry out the steps of:

displaying a decomposition tree including a plurality of levels, a first level including a parent node representing data with a measure along multiple dimensions and other levels including one or more child nodes that represent a subset of the data represented by the parent node along dimensions selected by a user;

rendering objects representing the parent node and the child nodes to graphically illustrate values represented by the nodes;

rendering connections representing the relationship between the parent node and the child nodes; and in response to the user applying a first splitting dimension and a second splitting dimension to a first selected node and a second selected node, the first and second selected nodes being in the same level, displaying in the level following the level including the first and second selected nodes, one or more nodes along the first splitting dimension and one or more nodes along the second splitting dimension, wherein the one or more nodes along the first and second splitting dimensions are intersecting datasets and the user applies the first and second splitting dimensions to the first selected node by dragging the first and second dimensions from a palate displaying available dimensions and the user applies the first and second splitting dimensions to the second selected node by dragging the first selected node in the decomposition tree to the second selected node, wherein the applied first splitting dimension and the applied second splitting dimension of the first selected node are applied to the second selected node and remain applied to the first selected node.

9. The non-transitory computer readable medium of claim 8, wherein each node is illustrated by an object having a minimum size and the value represented by the node is represented by visually encoding the object.

10. The non-transitory computer readable medium according to claim 8, wherein at least one node represents a plurality of measures.

11. The non-transitory computer readable medium according to claim 8, wherein the user applies at least one of the first splitting dimension to the first selected node and the second splitting dimension for the second selected node by applying another node in the decomposition tree to one of the first and second selected nodes.

12. The non-transitory computer readable medium according to claim 8, further comprising, in response to user selections, displaying in multiple levels one or more nodes along a same dimension.

13. The non-transitory computer readable medium according to claim 8, further comprising, in response to a user selection, collapsing a portion of the decomposition tree.

14. The non-transitory computer readable medium according to claim 8, further comprising, in response to the user applying a third splitting dimension and a fourth splitting dimension to a third selected node, displaying in a next level following the level with the third selected node, one or more nodes along the third splitting dimension and one or more nodes along the fourth splitting dimension.

15. The computer implemented method of claim 1, wherein the user applies at least one of the first splitting dimension and the second splitting dimension to a selected node by dragging one of the first splitting dimension and the second splitting dimension from the palate displaying available dimensions, wherein one of the applied first splitting dimension and the applied second splitting dimension are retained within the palate displaying available dimensions.

16. A system for displaying multi-dimensional data, the system comprising:

at least one data processor;

memory storing instructions which, when executed by the at least one data processor, result in operations comprising:

displaying, in a graphical user interface, a decomposition tree including a plurality of levels, a first level including a parent node representing data with a measure along multiple dimensions and other levels including one or more child nodes that represent a subset of the data represented by the parent node along dimensions selected by a user, wherein the child nodes are displayed along a same dimension at different levels of the decomposition tree;

in response to the user applying a first splitting dimension and a second splitting dimension to a first selected node and a second selected node, displaying the graphical user interface, in a next level following a level with the first selected node and a second selected node, one or more nodes along the first splitting dimension and one or more nodes along the second splitting dimension, wherein the one or more nodes along the first and second splitting dimensions are intersecting datasets and the user applies the first splitting dimension and the second splitting dimension to the first selected node by dragging the first and second splitting dimensions to the first selected node from a palate displaying available dimensions and the user applies the first splitting dimension and the second splitting dimension to the second selected node by dragging the first selected node in the decomposition tree to the second selected node, wherein the applied first splitting dimension and the applied second splitting dimension of the first selected node are applied to the second selected node and remain applied to the first selected node;

rendering, in the graphical user interface, objects representing the parent node and the child nodes to graphically illustrate values represented by the nodes; and rendering, in the graphical user interface, connections representing the relationship between the parent node and the child nodes.

17. The system of claim 16, wherein each node is illustrated by an object having at least a minimum size and the value represented by the node is presented by visually encoding the object.

18. The system of claim 16, wherein each node is illustrated by a circle having at least a minimum radius and the value represented by the node corresponds to a size of the circle.

19. The system of claim 16, wherein at least one node represents a plurality of measures.

20. The system of claim 16, wherein the parent node is split by multiple dimensions in a level following the level of the parent node.

* * * * *